(12) United States Patent
Fischer et al.

(10) Patent No.: US 6,952,981 B2
(45) Date of Patent: Oct. 11, 2005

(54) HYDRODYNAMIC 2-SPEED HYDRAULIC DRIVE

(75) Inventors: Wolfgang Fischer, Bernstadt (DE); Hubert Schmölz, Nattheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/312,382
(22) PCT Filed: Jun. 28, 2001
(86) PCT No.: PCT/EP01/07443
§ 371 (c)(1), (2), (4) Date: Sep. 9, 2003
(87) PCT Pub. No.: WO02/02966
PCT Pub. Date: Jan. 10, 2002

(65) Prior Publication Data
US 2004/0050206 A1 Mar. 18, 2004

(30) Foreign Application Priority Data
Jul. 3, 2000 (DE) .................. 100 33 790

(51) Int. Cl.⁷ .............................. F16H 47/06
(52) U.S. Cl. ..................... 74/733.1; 74/730.1
(58) Field of Search ............. 74/730.1, 731.1, 74/732.1, 733.1

(56) References Cited

U.S. PATENT DOCUMENTS 3,176,544 A * 4/1965 Baumeister .............. 74/732.1
3,683,719 A * 8/1972 Gros ...................... 192/3.25
4,471,670 A * 9/1984 Muller .................... 74/731.1
4,641,549 A    2/1987 Muller ...................... 74/732

FOREIGN PATENT DOCUMENTS

| DE | 1 137 754 | 11/1962 | |
| DE | 1 812 606 | 6/1970 | |
| DE | 3123133 | * 12/1982 | ......... 74/730.1 |
| DE | 34 15 909 | 10/1985 | |
| DE | 3730339 | * 3/1989 | ......... 74/730.1 |
| DE | 43 07 222 | 9/1994 | |
| FR | 894.670 | 1/1945 | |
| GB | 793263 | 4/1958 | |
| GB | 2 067 686 | 7/1981 | |

* cited by examiner

Primary Examiner—Ha Ho
(74) Attorney, Agent, or Firm—Baker & Daniels

(57) ABSTRACT

A hydrodynamic 2-speed turbine drive, in particular, a turbine drive for application in under-floor or low-floor drive systems on rail vehicles, with two hydrodynamic components for the formation of two tractive-work circuits for two different speed ranges. A first hydrodynamic component is in the form of a hydrodynamic speed/torque converter and a second hydrodynamic component is in the form of a hydrodynamic clutch. The converter and the clutch are arranged parallel to each other and with no, or very little, offset between drive input shaft and drive output shaft.

20 Claims, 2 Drawing Sheets

HYDRODYNAMIC 2-SPEED HYDRAULIC DRIVE

The invention relates to a hydrodynamic multiple-circuit drive, in particular a 2-speed turbine drive for application in under-floor drive systems on rail vehicles, and further to a drive system with a hydrodynamic multiple-circuit drive and a running gear of a rail vehicle.

Hydrodynamic multiple-circuit drives, in particular in the form of turbine drives for application on rail vehicles are known in a number of designs. As representatives, reference is made to
1. DE 43 07 222 A1
2. DE 18 12 606 A
3. DE 34 15 909 A With these designs it is a matter of drives in which the power transfer in the individual gears is achieved by multiple hydrodynamic circuits. A turbine drive is understood as a drive in which several hydraulic circuits are combined in such a way that their utilization ranges complement each other. This complementing can consist in the fact that further hydraulic circuits, for example hydrodynamic speed-torque converters or hydrodynamic clutches, expand the operating radius from the first hydraulic gear facing the engine or are also used for braking and accelerating with one's back to the engine. Such drives differ in accordance with their design for a specified number of speed ranges with regard to the type and number of hydrodynamic circuits used as well as in their arrangement with regard to the axle drive shaft and driven shaft of the drive assembly unit. A generic hydrodynamic multiple-circuit drive with two tractive work circuits is known from Voith Druck G 1454, 3.96. The turbine drive described in this publication is conceived as a two-speed drive for streetcars with a torque converter and a hydrodynamic clutch and a hydrodynamic retarder as well as a mechanical reverse part. In filled circuits—hydrodynamic torque converter or hydrodynamic clutch—the power transfer between the pump and turbine wheel occurs through the forces of gravity of the operating fluid. First gear is achieved by means of the hydrodynamic speed-torque converter. In the process, the stationary guide wheel, depending on the drive state, absorbs the differential moment between the pump and turbine wheel and causes an infinitely variable and automatic torque conversion. The hydrodynamic clutch is activated in second gear. The torque released by the turbine is always equal to the torque absorbed from the pump. During or upon traction the gear change takes place between the hydrodynamic speed-torque converter and the hydrodynamic clutch automatically, without tractive force interruption softly, free of impact and wear through the filling and emptying of the circuits. The hydrodynamic retarder also makes braking possible without wear. Change of direction occurs when the vehicle is stopped by an integrated mechanical reverse gear with a hydraulically activated reverse switch cylinder. In particular the power transfer occurs from a driving motor for example by means of a torsionally elastic clutch and a propeller shaft on the input shaft of the turbine drive. A step-up spur gear is arranged on the input shaft, which uses two step-up pinions to drive the two primary shafts with the pump wheels of the two hydrodynamic circuits. The pump wheels transfer the power through the forces of gravity of the operating fluid to the turbine wheels. The hydrodynamic speed-torque converter and the hydrodynamic clutch for the second gear stage are developed and designed in such a way that they work with good efficiency in the lower and upper speed ranges on equal mechanical speed reduction. The hydrodynamic clutch and the hydrodynamic speed-torque converter are arranged in tandem when considered in axial direction between the drive input shaft and drive output shaft and the primary parts on a common shaft, that is, coaxially to one another. However, such a drive assembly unit for achieving two gear stages in axial direction is tremendously long. In particular in application in low-floor or under-floor drive systems on rail vehicles with a drive machine coupled with multiple-circuit drive this design can result in problems, since the available building space in axial direction between the connection of the drive machine on the freight car body and the wheels stored in a bogie is not sufficient and thus it becomes necessary to create central or lateral drives on the multiple-circuit drive or interpolate reverse gears to achieve a corresponding u-shaped or v-shaped arrangement of drive assembly unit and drive machine. However, this involves either considerable modifications to the drive itself or the requirement of providing additional components in the form of reverse gears, increases of the drive or overall weight of the drive system and in addition results in a considerable multiplicity of variants.

A hydrodynamic multiple-circuit drive is known from German Patent Specification DE 1137 754 B which has two hydrodynamic circuits that are arranged parallel to one another with basically only slight axial offset. These circuits are connected to each other by a step-up trio. In analogy this also applies for the connection of the drives with the output of the drive assembly unit. A clutch is provided between the drive input shaft and the hydrodynamic clutch. This is intended to make possible the purely mechanical transfer of power. The overall working area of the drive assembly unit is composed of a first hydrodynamic gear stage, which is achieved by the hydrodynamic speed-torque converter as well as a second mechanical gear stage, whereby the hydrodynamic clutch is in operation in the transition between the first and second gear stage and transfers the power over a portion of the transition region, whereby this simultaneously serves for synchronization of the individual clutch elements of the clutch that are brought into operative connection with each other. With this design the additional building space for the clutch in an axial direction is to be considered. In addition, a reversal of the direction of rotation is not possible with this design.

A generic hydrodynamic multiple-circuit drive in the form of a 2-speed turbine drive is already known from publication DE 34 15 909 A. This also comprises a drive input shaft and a drive output shaft as well as two hydrodynamic components for forming two tractive-work circuits for two different speed ranges—a first hydrodynamic component in the form of a hydrodynamic speed-torque converter and a second hydrodynamic component in the form of a hydrodynamic clutch. A high gear set for driving the two hydrodynamic components is coupled with the drive input shaft. The hydrodynamic speed-torque converter is connected with the drive output shaft by means of a reverse gear set. Both hydrodynamic components are arranged parallel to each other and with no, or with very little offset when considered in the axial direction between drive input shaft and drive output shaft. Both hydrodynamic components comprise at least one pump wheel locked with a primary shaft and one turbine wheel locked with a secondary shaft. Further a hydrodynamic brake mechanism is provided in the drive assembly unit, which is designed in the form of a hydrodynamic retarder. The retarder is arranged in the gearbox case without changing its length, i.e. without influence on the axial location of a drive flange coupled with the drive output shaft.

Further, a reverse gear set is provided, however it is flanged to the basic gear. Additional mechanical transfer mechanisms are provided for achieving the individual gear stages, so that the total gear builds very long in an axial direction.

Therefore, the task of the invention was based on further development of a hydrodynamic multiple-circuit drive of the type initially mentioned, in particular a 2-speed turbine drive with two hydrodynamic components for achieving two tractive-work circuits in such a way that the mentioned disadvantages are a drive assembly unit requires a minimum building space in horizontal and vertical direction for the achievement of a multitude of functions, for example reversal of the direction of rotation and the formation of a braking moment, and thus is easily integrable in drive systems, particularly for application in rail vehicles without required modifications to the drive itself, the clutch with the drive machine or the input shafts of the axle drive, as a rule inserted afterwards by means of shafting. The drive design should be suitable for a multitude of drive systems with variable environmental requirements with regard to the available building space and thus contribute to the reduction of the multiplicity of variants with regard to the connection of the individual elements and the resulting development of the individual components of the drive system.

The solution of the invention is characterized by the hydrodynamic clutch being connected with the drive input shaft by means of the reverse gear set, the secondary shafts connected with the reverse gear set whereby the first secondary shaft is connected by means of at least one connecting spur gear with the reverse gear set, the secondary shaft being directly coupled with the reverse gear set, and the hydrodynamic retarder being in coaxial arrangement to the hydrodynamic speed-torque converter.

The hydrodynamic multiple-circuit drive in the form of a 2-speed turbine drive with a drive input shaft and a drive output shaft has two hydrodynamic components for the formation of two tractive-work circuits for two different speed ranges—a first hydrodynamic component in the form of a hydrodynamic speed-torque converter and a second hydrodynamic component in the form of a hydrodynamic clutch. A high gear set coupled with the drive input shaft is provided for driving the hydrodynamic speed-torque converter and the hydrodynamic clutch. The hydrodynamic speed-torque converter and the hydrodynamic clutch are further connected to the drive output shaft by a reverse gear set. According to the invention, the two hydrodynamic components, the hydrodynamic speed-torque converter and the hydrodynamic clutch are arranged parallel to each other and with no, or very little offset when considered in the axial direction between the drive input shaft and the drive output shaft. Preferably the two are arranged on a horizontal plane. That is, the two are, when considered in the axial direction, arranged not in tandem, but rather basically on a common plane or in the range of a common plane, which is describable by a perpendicular at the drive input shaft in horizontal direction and a perpendicular at the drive input shaft in vertical direction. This arrangement makes an extremely short construction possible with regard to the arrangement of the hydrodynamic components.

A reverse gear set is in axial direction to the individual hydrodynamic components, which is coupled to the drive output shaft. The reverse gear set is made possible by two spur gear trains which compared to the designs of multiple-circuit drives with two speeds in accordance with the state of the art technology do not require any additional building space. Through the coupling between the individual elements of the two spur gear trains differing directions of rotation are achieved at the drive output shaft. The reverse gear set is directly coupled with one of the two secondary shafts and coupled with the other one by a connection gear, preferably a connecting spur gear.

Regarding concrete design, the hydrodynamic speed-torque converter has at least one pump wheel locked with a first primary shaft, one turbine wheel locked with a first secondary shaft and one guide wheel. The hydrodynamic clutch comprises a pump wheel locked with a second primary shaft and a turbine wheel locked with a second secondary shaft.

The coupling of the drive elements, in particular turbine wheels of the individual hydrodynamic components with the drive output shaft takes place by means of secondary shafts locked with the turbine shafts and the reverse gear set. The reverse gear set comprises two spur gear trains, a first spur gear train and a second spur gear train, whereby resources are provided for coupling between individual elements between the first and the second spur gear train for the purpose of changing the power flow direction and thus causing the reversal of the direction of rotation. The first spur gear train is formed by a spur gear locked with a secondary shaft and a further spur gear, which functions as an intermediate timing gear in the connection of the other secondary shaft to the reverse gear set by means of a connecting spur gear, while the second spur gear train, offset in horizontal direction, is formed by two spur gear trains, combing with an intermediate timing gear which is locked with the drive output shaft, and coaxially coupled with the intermediate timing gear of the first spur gear train and coaxially coupled with the secondary shaft connected to the turbine wheel of the hydrodynamic clutch. The resources for achieving the reversal of the direction of rotation comprise, for example, two sliding switch shafts which are preferably arranged parallel to each other, that is in longitudinal direction basically not offset to each other and which alternately connect the intermediate timing gear of the first spur gear train and the coaxially arranged spur gear of the second spur gear train or the spur gear locked with the second secondary shaft with the coaxially arranged spur gear of the second spur gear train.

The connection of the reverse gear set to the clutch and the coupling of the hydrodynamic speed-torque converter with the reverse gear set by means of a connecting spur gear makes it possible to arrange the elements of the reverse gear set parallel to the secondary shaft which is coupled with the converter, so that in axial direction upon extension of the secondary shaft coupled with the converter there is sufficient building space available for the arrangement of the retarder, which does not result in an additional extension of the drive assembly unit. The retarder can thus be arranged parallel to the reverse gear set and when considered in axial direction does not extend beyond or extends only slightly beyond the axial extension of the reverse gear set.

In addition it is particularly advantageous to integrate a hydrodynamic retarder in the gearbox case or to provide a corresponding projecting part for receiving the retarder in the gearbox case. The retarder, in particular its rotor blade wheel, is preferably locked with the secondary shaft of the hydrodynamic component which is coupled by means of the connecting spur gear to the reverse gear set. The hydrodynamic retarder can thus be integrated into the gearbox case without changing its length or flanged to it. Without changing its length means that no collision of the retarder or its external dimensions occurs with the drive flange or that the arrangement of the retarder is achieved without any influence on the axial arrangement of the drive flange. Preferably the connection of the first secondary shaft takes place by means of the connecting spur gear to the reverse gear set. That means that the rotor blade wheel of the hydrodynamic retarder is coupled with the secondary shaft of the hydrodynamic speed-torque converter and thus arranged in an area of the drive which is free from the second spur gear train. This design makes a short overall length possible.

In particular, the combination of the features of the arrangement of the tractive-components of the torque-speed converter and the hydrodynamic clutch as well as the length-neutral arrangement of the hydrodynamic retarder and arrangement of the drive, that is when considered in vertical direction offset to the drive input shaft in vertical direction to the drive output shaft, makes the creation of a very short building drive assembly unit possible in an axial direction.

In accordance with a further aspect of the invention the drive output shaft is arranged parallel to the drive input shaft, however offset in a vertical direction to it. This design makes an optimum connection possible to the connection elements using the available building space, in particular for application in under-floor or low-floor drive systems. In the process, the following two borderline situations can also be covered optimally with a multiple-circuit drive of very short overall length in accordance with the invention: projection into a common horizontal plane coaxial arrangement of drive input shaft and drive output shaft, i.e., parallel arrangement with offset in the vertical direction however with no offset or with little offset in the horizontal direction parallel arrangement with great offset in horizontal direction.

The primary shafts are coupled with the outlets of the step-up gear set, while the secondary shafts are coupled with the reverse gear set—with the first secondary shaft coupled by means of a connecting spur gear and the second secondary shaft coupled directly. The individual hydrodynamic circuits are driven by a step-up gear set allocated to both, which is preferably comprised of three spur gears. A first spur gear, the so-called step-up gear spur gear, is locked with the drive input shaft. This step-up gear spur gear is in mesh with corresponding step-up gear pinions, which are at least indirectly locked with the primary shafts. The coupling of the pinions with the individual primary shafts can take place either in such a way that it cannot be turned or twisted by means of a non-positive and/or positive connection or the one-piece design of pinion and primary shaft. Another possibility consists in implementing corresponding circuit elements, which make an optional locking connection possible between the pinion and the primary shaft.

The solution of the invention describes just the basic structure of a drive assembly unit which can be supplemented by further additional functional elements, which will not be covered in detail here, whereby it is however assumed that these are discretionary with the competent person skilled in the art.

The solution of the invention is illustrated in the following by means of figures. The figures specify the following:

FIG. 1a using a section A–B from a front view of a drive in accordance with FIG. 1b, illustrates a design in accordance with the invention of a multiple-circuit drive, in particular, a turbine drive;

Figure 1A:
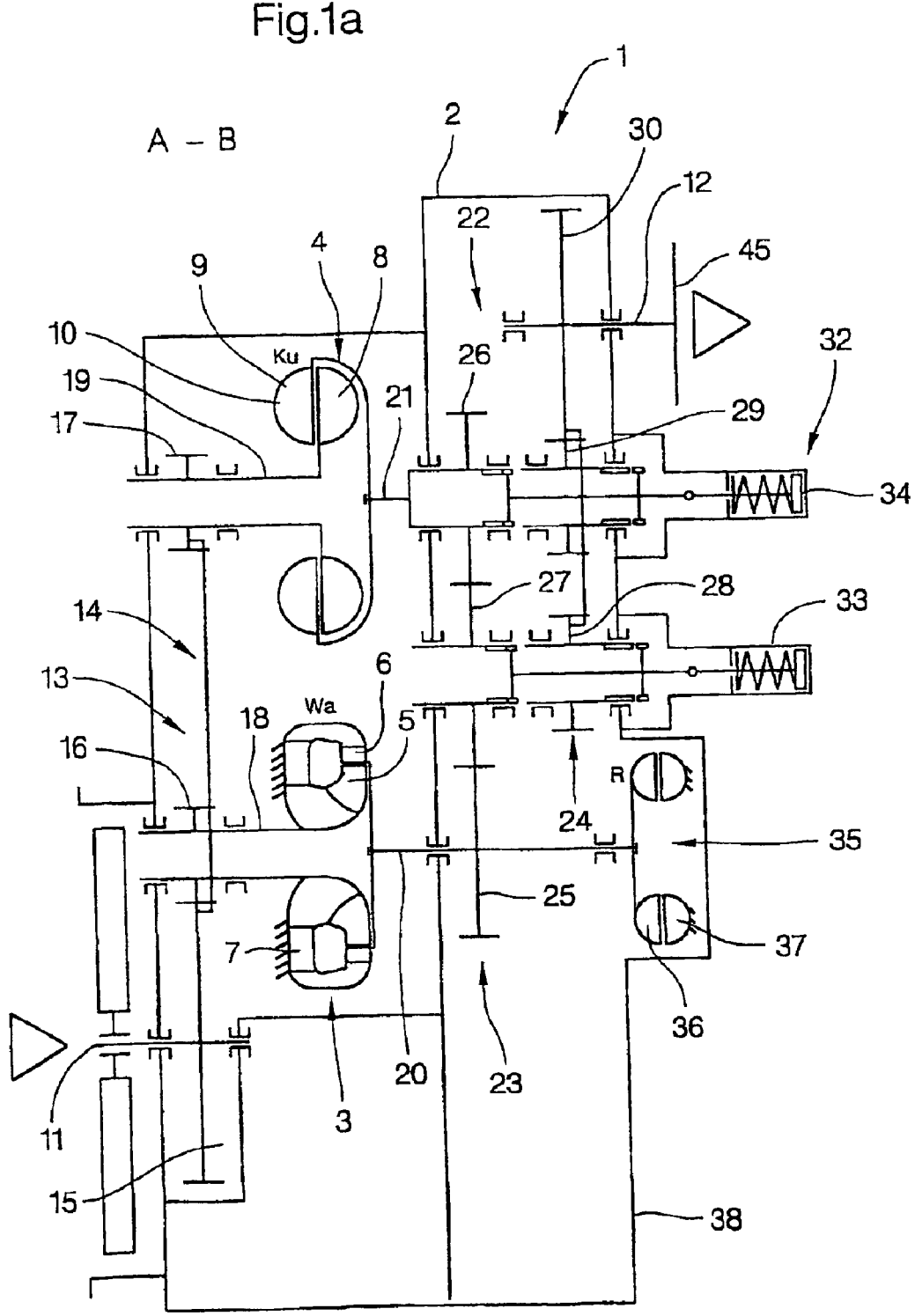
FIG. 1b illustrates a front view of design in accordance with the invention of a multiple-circuit drive, in particular, a turbine drive.
Figure 1B:
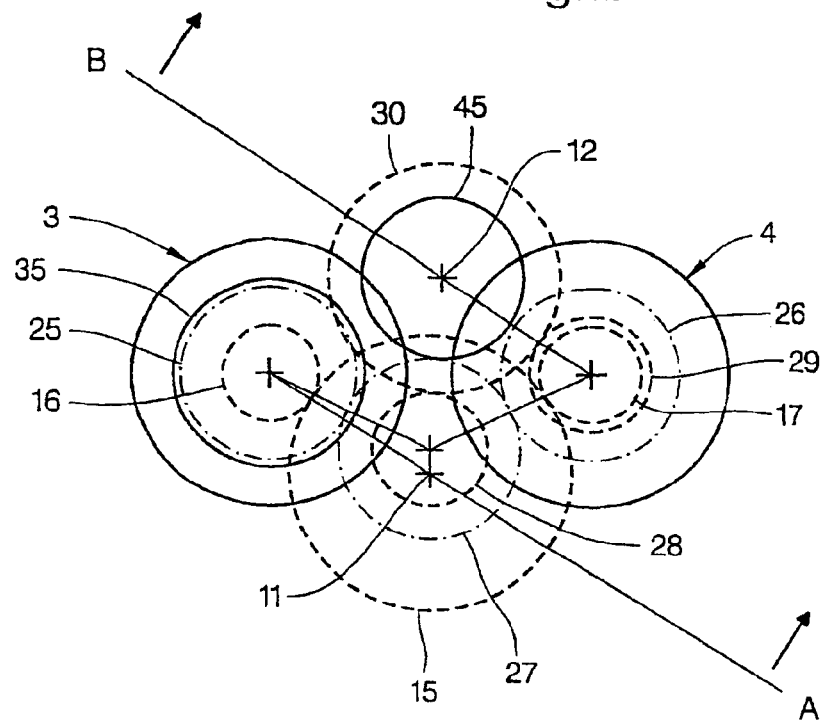

FIG. 1a uses a section A–B from a front view to illustrate an advantageous design in accordance with the invention of a multiple-circuit drive 1, in particular a 2-speed turbine drive 2 in accordance with FIG. 1b, its structure and operation. By multiple-circuit drive 1 a drive assembly unit is understood, in which several hydraulic circuits are combined with each other in such a way that their utilization ranges complement one another. With turbine drives the complementing consists in the fact that further hydraulic circuits expand the operating radius from the first hydraulic gear facing the engine. To achieve the power transfer in the individual gears, which characterize differing speed ranges the multiple-circuit drive 1 comprises two hydraulic tractive-work circuits, which are fanned by a hydrodynamic speed-torque converter 3 and a hydrodynamic clutch 4. The hydrodynamic speed-torque converter 3 includes a pump wheel 5, a turbine wheel 6 and at least one guide wheel 7. The hydrodynamic speed-torque converter 3 can be of differing design concerning the arrangement of guide wheel 7 between the pump and turbine wheel with regard to the flow guidance. The concrete selection of the hydrodynamic speed-torque converter occurs in the gear range in accordance with the application case and the characteristics to be achieved. The hydrodynamic clutch 4 comprises a pump wheel 8 and a turbine wheel 9, which together form at least one toroidal working area 10. According to the invention, both are arranged parallel to each other and with no or very little offset when considered in the axial direction from a drive input shaft 11 to drive output shaft 12. Preferably the arrangement occurs on a common horizontal plane, which as a rule is in vertical alignment to the axial section plane, i.e. without offset, directly on a plane which is describable by the perpendiculars at the rotational axis of the individual pump wheels or in other words, in a side view in tandem. Both—hydrodynamic speed-torque converter 3 and hydrodynamic clutch 4—are at least indirectly locked with drive input shaft 11 and drive output shaft 12. To achieve coupling, resources 13 are provided for coupling the individual hydrodynamic circuits—hydrodynamic speed-torque converter 3 and hydrodynamic clutch 4—with drive input shaft 11. Resources 13 comprise a three-wheeled step-up gear 14. This includes at least one step-up gear wheel 15, in particular in the form of a spur gear which comes with step-up gear pinions 16 and 17, whereby step-up gear pinion 16 can be locked to a first primary shaft 18, coupled with pump wheel 8 of the hydrodynamic speed-torque converter 3. The second step-up gear pinion 17 can be locked to a second primary shaft 19, which is coupled with pump wheel 5 of hydrodynamic clutch 4. The secondary shafts which are locked to the turbine wheels 6 of the hydrodynamic speed-torque converter 3 or 9 of the hydrodynamic clutch 4—a first secondary shaft 20 and a second secondary shaft 21–are connected with the drive output shaft 12 by means of a reverse gear set 22. This reverse gear set comprises a first spur gear train 23 and a second spur gear train 24. The first spur gear train 23 comprises two spur gears 26 and 27, which are in mesh with each other. Spur gear 26 is locked with the second secondary shaft 21. The connection of the first secondary shaft 20 to the first spur gear train 23 and with it reverse gear set 22 takes place by means of a connecting spur gear 25, which meshes with spur gear 27, which then functions as an intermediate timing gear between the two spur gears 25 and 26 coupled with secondary shafts 20, 21 and subsequently termed as intermediate timing gear 27. The second spur gear train 24 comprises three spur gears in mesh with each other, a first spur gear 28, a second spur gear 29 and an intermediate timing gear 30, which combs with both the first spur gear 28 and the second spur gear 29. Intermediate timing gear 30 is locked with drive output shaft 12. The two spur gears 28 and 29 of the second spur gear set 24 are in coaxial arrangement to intermediate timing gear 27 and the spur gear 26 coupled with the second secondary shaft 21 of the first spur gear train 23. Reverse gear set 22 has resources 32 for achieving the reversal of the direction of rotation. These resources comprise two switch cylinders with sliding switch shafts, a first switch cylinder with sliding switch shaft 33 and a second switch cylinder with sliding switch shaft 34. Depending on their position, both sliding switch shafts make a power transfer possible from the first spur gear train 23 to the second spur gear train 24. The first sliding switch shaft is allocated to intermediate timing gear 27 of the first spur gear train 23 while the second sliding switch shaft 34 is allocated to the second spur gear 26 and the spur gear 29 of the second spur gear train 24. The sliding switch shafts 33 and 34 are in parallel arrangement to each other. Their axial extension considered from drive input to drive output is restricted to a minimum. The power transfer in the individual speed ranges takes shape as follows: The drive input shaft 11, which as a rule can be coupled with a drive machine, is driven by it. The step-up gear spur gear 15 of the three-wheeled step-up gear 14 arranged on drive input shaft 11 uses step-up gear pinions 16 and 17 to drive the primary shafts 18 and 19 of pump wheels 5 of the speed-torque converter 3, which are locked to them and pump wheel 8 of the hydrodynamic clutch 4. Pump wheels 5 and 8 transfer the power through the forces of gravity of the operating fluid to the corresponding turbine wheels, turbine wheel 6 of the hydrodynamic speed-torque converter 3 and turbine wheel 9 of the hydrodynamic clutch 4. The power transfer in first gear occurs by means of the hydrodynamic speed-torque converter 3, the power transfer in second gear is achieved by means of the hydrodynamic clutch 4. The hydrodynamic speed-torque converter 3 and hydrodynamic clutch 4 are developed and designed in such a way that they work with good efficiency in the lower and upper speed ranges on equal mechanical speed reduction in reverse gear set 22. The power transfer from turbine wheels 6 and 9 to the corresponding secondary shafts 20 and 21 and from these to drive output shaft 12 occurs by means of spur gear trains 23 and 24 of reverse gear set 22 either directly or through the intermediary of the connecting spur gear 25 to drive output shaft 12. The positions of the two sliding switch shafts 33 and 34 are critical for the direction of rotation at drive output shaft 12. If the second sliding switch shaft 34 is actuated in such a way that it locks spur gear 26 of the first spur gear train 23 with spur gear 29 of the second spur gear train 24, the power transfer occurs from drive input shaft 11 in the first gear by means of hydrodynamic speed-torque converter 3 to the first secondary shaft 20, to the first connecting spur gear 25 which is locked to it, to intermediate timing gear 27 and spur gear 26 of the first spur gear train 23 and from here to spur gear 29 of the second spur gear train 24, which is locked to spur gear 26, as well as to intermediate timing gear 30, which is in mesh with spur gear 29 and is also locked with drive output shaft 12. The power flow from the drive input shaft by means of the hydrodynamic clutch takes place then in second gear with the spur gear 26 which is locked with secondary shaft 21 by means of the second sliding switch shaft 34 in the first switch position to the second spur gear 29 and the intermediate timing gear 30 of the second spur gear train 24. In reverse operation in both gear stages the power flow is conducted by a positioning of the first sliding switch shaft 33, which makes a locking connection possible between intermediate timing gear 27 and the first spur gear 28 of the second spur gear train 24. In the individual gear stages only the hydrodynamic component that is in operation—the hydrodynamic speed-torque converter 3 or hydrodynamic clutch 4—is refueled.

Drive output shaft 12 is basically in coaxial arrangement to the drive input shaft when considered in axial section, however preferably stacked on top of each other when considered in vertical direction. That is, preferably an arrangement occurs in the area of a common plane characterized by an axial section, which is characterized by the theoretical course of the drive input shaft and the drive output shaft and a perpendicular in vertical direction to them. This arrangement makes a space saving design possible both in horizontal and vertical directions. However, arrangements with an offset in horizontal direction are also conceivable. In view of the assembly circumstances, i.e. in particular the given connection standards for the other elements of the drive train, this is selected and achieved by corresponding design of the spur gears of the reverse gear set.

In the drive design 1 illustrated in FIG. 1 a the reverse gear set 22 is arranged advantageously behind the hydrodynamic clutch 4, whereby the connection between a transfer member of the reverse gear set 22, in this case spur gear 26, occurs through the locking connection between second secondary shaft 21 and spur gear 26 without intermediary of additional components involved in the power transfer and speed-torque conversion, that is the connection occurs directly. This connection can be designed differently. For connection of the hydrodynamic speed-torque converter 3 to the drive output shaft 12 through the intermediary of reverse gear set 22, connecting spur gear 25 is provided for coupling the first secondary shaft 20 with reverse gear set 22. This arrangement makes an especially space-saving design possible, since the reverse gear set is arranged behind the hydrodynamic clutch, which builds shorter in axial direction.

In accordance with a further aspect of the invention the multiple-circuit drive 1 has a hydrodynamic brake mechanism 35. This is arranged on the first secondary shaft 20 without changing its length. That means that the arrangement or location of retarder 35 is achieved without any influence on the axial arrangement of drive flange 45. Neither retarder 35 nor drive flange 45 collide with regard to their external dimensions. The arrangement occurs considered in axial direction between drive input shaft 11 and drive output shaft 12 behind the connecting spur gear 25 provided for the connection with the reverse gear set 22. The hydrodynamic retarder comprises a rotor blade wheel 36, which is preferably locked with the first secondary shaft 20 and a stator 37, whereby the stator is preferably stored in gearbox case 38 or formed by it.

The view from the front in accordance with FIG. 1b illustrates the side-by-side arrangement of hydrodynamic speed-torque converter 3 and hydrodynamic clutch 4. The drive input shaft is arranged offset in horizontal direction to primary shafts 18 and 19 of the hydrodynamic components. The arrangement occurs parallel. Additionally it can be seen that the two primary shafts, first primary shaft 18 and second primary shaft 19 considered preferably in assembly position are arranged on a common horizontal plane. Drive output shaft 12 is arranged in axial direction on a plane with drive input shaft 11, however offset in vertical direction to it. Additionally it can be seen that along with the arrangement of the individual power transferring elements on vertical planes to each other, there is an arrangement on horizontal planes. Here too it is again evident that compared with the drive input shaft, drive output shaft 12 is conducted offset in a horizontal direction.

Figure 2:
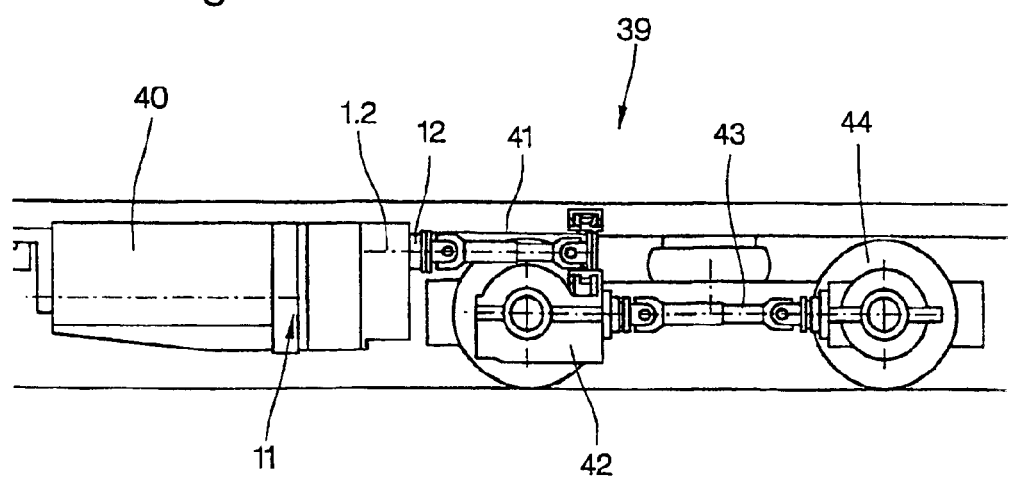
FIG. 2 illustrates in schematically greatly simplified display an arrangement of a multiple-circuit drive developed in accordance with the invention in a drive train for rail vehicles, in particular in an under-floor or lower-floor drive.

The multiple-circuit drive designed in accordance with the invention is preferably used in a drive unit 39 in accordance with FIG. 2 for rail vehicles, whereby it is suitable mainly for low-floor or under-floor applications. Drive input shaft 11 is coupled with a drive machine 40. The drive output shaft is connected with a first wheel set gear 42 by a universal joint propeller shaft train 41. The first wheel set gear 42 is in turn connected with a second wheel set gear 44 by a universal joint propeller shaft train 43.

The solution of the invention makes a design of a multiple-circuit drive possible for applications which require an extremely short overall length and low overall height. The components necessary for achieving operation have been reduced to a minimum here. However, the provision of additional function components is also conceivable.

DRAWING REFERENCE LIST

1 Multiple-circuit drive
2 Turbine drive
3 hydrodynamic speed-torque converter
4 hydrodynamic clutch
5 pump wheel of the hydrodynamic speed-torque converter
6 turbine wheel of the hydrodynamic speed-torque converter
7 Guide wheel of the hydrodynamic speed-torque converter
8 pump wheel of the hydrodynamic clutch
9 turbine wheel of the hydrodynamic clutch
10 toroidal working area
11 drive input shaft
12 drive output shaft
13 Means for coupling the individual hydraulic circuits with the drive input shaft
14 three-wheeled high gear
15 high gear wheel
16 high gear pinion
17 high gear pinion
18 first primary shaft
19 second primary shaft
20 first secondary shaft
21 second secondary shaft
22 reverse gear set
23 first spur gear train
24 second spur gear train
25 spur gear, connecting spur gear
26 spur gear
27 intermediate timing gear
28 first spur gear
29 second spur gear
30 intermediate timing gear
32 resources for achieving a reversal of the direction of rotation
33 first switch cylinder with sliding switch shaft
34 second switch cylinder with sliding switch shaft
35 hydrodynamic brake mechanism
36 rotor blade wheel
37 stator
38 gearbox case
39 drive unit
40 drive machine
41 universal joint propeller shaft
42 first wheel set gear
43 universal joint propeller shaft
44 second wheel set gear
45 drive flange

What is claimed is:

1. A hydrodynamic 2-speed hydraulic drive for application in under-floor drive systems on rail vehicles with a low-floor part, comprising:

a drive input shaft (11) and a drive output shaft (12);

two hydrodynamic components for formation of two tractive-work circuits for two different speed ranges including a first hydrodynamic component in a form of a hydrodynamic speed-torque converter (3) and a second hydrodynamic component in a form of a hydrodynamic clutch (4);

a step-up gear set coupled with the drive input shaft (11) for driving the hydrodynamic speed-torque converter (3) and the hydrodynamic clutch (4);

the hydrodynamic speed-torque converter (3) being connected with the drive output shaft (12) by means of a reverse gear set (22);

the hydrodynamic speed-torque converter (3) and the hydrodynamic clutch (4) being arranged parallel to each other and with generally no offset when considered in the axial direction between the drive input shaft (11) and the drive output shaft (12);

the hydrodynamic speed-torque converter (3) comprising at least one pump wheel (5) locked with a first primary shaft (18) and one hydraulic wheel (6) locked with a first secondary shaft (20) and a guide wheel (7);

the hydrodynamic clutch (4) comprising a pump wheel (8) locked with a second primary shaft (19) and a hydraulic wheel (9) locked with a second secondary shaft (21);

a hydrodynamic brake mechanism in a form of a hydrodynamic retarder (35);

the hydrodynamic retarder (35) arranged in a gearbox case (38) without changing the length of the case, that is without any influence on an axial location of a drive flange (45) coupled with the drive output shaft (12);

the hydrodynamic clutch (4) being connected with the drive output shaft (12) by means of the reverse gear set (22);

the secondary shafts (20, 21) connected with the reverse gear set (22), whereby the first secondary shaft (20) is connected by means of at least one connecting spur gear (25) with the reverse gear set (22) and the second secondary shaft is directly coupled with the reverse gear set (22);

the hydrodynamic retarder in coaxial arrangement to the hydrodynamic speed-torque converter.

2. The hydrodynamic 2-speed hydraulic drive (1) as set forth in claim 1, wherein the hydrodynamic speed-torque converter (3) and the hydrodynamic clutch (4) are arranged on a horizontal plane.

3. The hydrodynamic 2-speed hydraulic drive (1) as set forth in claim 1, wherein the drive input shaft (11) and the drive output shaft (12) are arranged in a vertical direction offset to each other.

4. The hydrodynamic 2-speed hydraulic drive (1) as set forth in claim 3, wherein the drive output shaft (12) is arranged above the drive input shaft (11) considered in the vertical direction between the drive input shaft (11) and the drive output shaft (12).

5. The hydrodynamic 2-speed hydraulic drive (1) as set forth in claim 3, wherein the drive input shaft (11) and the drive output shaft (12) are basically arranged on a common plane aligned in the vertical direction.

6. The hydrodynamic 2-speed hydraulic drive (1) as set forth in claim 3, wherein the drive input shaft (11) and the drive output shaft (12) are arranged parallel to each other at a specific distance when considered in a horizontal direction.

7. The hydrodynamic 2-speed hydraulic drive (1) as set forth in claim 1, wherein the primary shafts (18, 19) are coupled with outputs of the step-up gear set.

8. The hydrodynamic 2-speed hydraulic drive (1) as set forth in claim 7, wherein the step-up gear set (14) comprises one step-up gear wheel locked with the drive input shaft (11) and two step-up gear pinions (16, 17) each connected with one of the primary shafts (18, 19).

9. The hydrodynamic 2-speed hydraulic drive (1) as set forth in claim 8, wherein the step-up gear pinions (16, 17) and the primary shafts (18, 19) are formed of separate components and connected with each other non-positively and/or positively.

10. The hydrodynamic 2-speed hydraulic drive (1) as set forth in claim 8, wherein the connection between the step-up gear pinions (16, 17) and the primary shafts (18, 19) is severable.

11. The hydrodynamic 2-speed hydraulic drive (1) as set forth in claim 10, wherein the step-up gear pinions (16, 17) and the primary shafts (18, 19) are designed in one piece.

12. The hydrodynamic 2-speed hydraulic drive (1) as set forth in claim 7, wherein:

the reverse gear set (22) comprises two spur gear trains including a first spur gear train (23) and a second spur gear train (24);

and including resources (32) for achieving a reversal of the direction of rotation, which connect the two spur gear trains (23, 24) in tractive operation and in reversing operation.

13. The hydrodynamic two-speed hydraulic drive (1) as set forth in claim 12, wherein:

the first spur gear train (23) comprises a first spur gear (26) locked with the second secondary shaft (21) and an intermediate timing gear (27) in mesh with the first spur gear (26) and the connecting spur gear (25);

the second spur gear train (24) comprises second and third spur gears (28, 29) with the second spur gear (28) coaxially locked to the intermediate timing gear (27) of the first spur gear train (23) and the second spur gear (29) coaxially locked with the second secondary shaft (21), which are in mesh with another intermediate timing gear (30) which is locked with the drive output shaft (12);

the resources (32) for achieving the reversal of the direction of rotation, comprising two sliding switch shafts (33, 34), which each alternately connect the second spur gear (28) of the second spur gear train in coaxial arrangement or the connecting spur gear (25) which is locked with the second secondary shaft (21) with the spur gear (29) of the second spur gear train (24).

14. A drive unit (39), for application in under-floor drive systems on rail vehicles with a low-floor part, comprising:

a drive machine (40);

a hydrodynamic two-speed hydraulic drive (1) coupled with the drive machine in accordance with claim 1;

a wheel set gear (42) that can be coupled with a wheel to be driven;

the drive output shaft (12) of the hydrodynamic 2-speed hydraulic drive (1) being coupled with an input shaft of the wheel set gear (42) by means of a universal joint propeller shaft (41).

15. A running gear of a rail vehicle with a drive unit (39) in accordance with claim 14.

16. The hydrodynamic 2-speed hydraulic drive (1) as set forth in claim 2, wherein the drive input shaft (11) and the drive output shaft (12) are arranged in a vertical direction offset to each other.

17. The hydrodynamic 2-speed hydraulic drive (1) as set forth in claim 4, wherein the drive input shaft (11) and the drive output shaft (12) are basically arranged on a common plane aligned in the vertical direction.

18. The hydrodynamic 2-speed hydraulic drive (1) as set forth in claim 4, wherein the drive input shaft (11) and the drive output shaft (12) are arranged parallel to each other at a specific distance when considered in a horizontal direction.

19. The hydrodynamic 2-speed hydraulic drive (1) as set forth in claim 2, wherein the primary shafts (18, 19) are coupled with outputs of the step-up gear set.

20. The hydrodynamic 2-speed hydraulic drive (1) as set forth in claim 3, wherein the primary shafts (18, 19) are coupled with outlets of the step-up gear set.

* * * * *

UNITED STATES PATENT AND TRADEMARK OFFICE
CERTIFICATE OF CORRECTION

PATENT NO. : 6,952,981 B2
DATED : October 11, 2005
INVENTOR(S) : Wolfgang Fischer et al.

It is certified that error appears in the above-identified patent and that said Letters Patent is hereby corrected as shown below:

<u>Column 1,</u>
Line 41, delete "the".

<u>Column 12,</u>
Line 7, before "spur" insert -- third --.

Signed and Sealed this

Twenty-fourth Day of January, 2006

JON W. DUDAS
*Director of the United States Patent and Trademark Office*